Aug. 12, 1969   J. PERKINS   3,460,285
FISHING LINE ACCESSORY
Filed Dec. 19, 1966   3 Sheets-Sheet 3

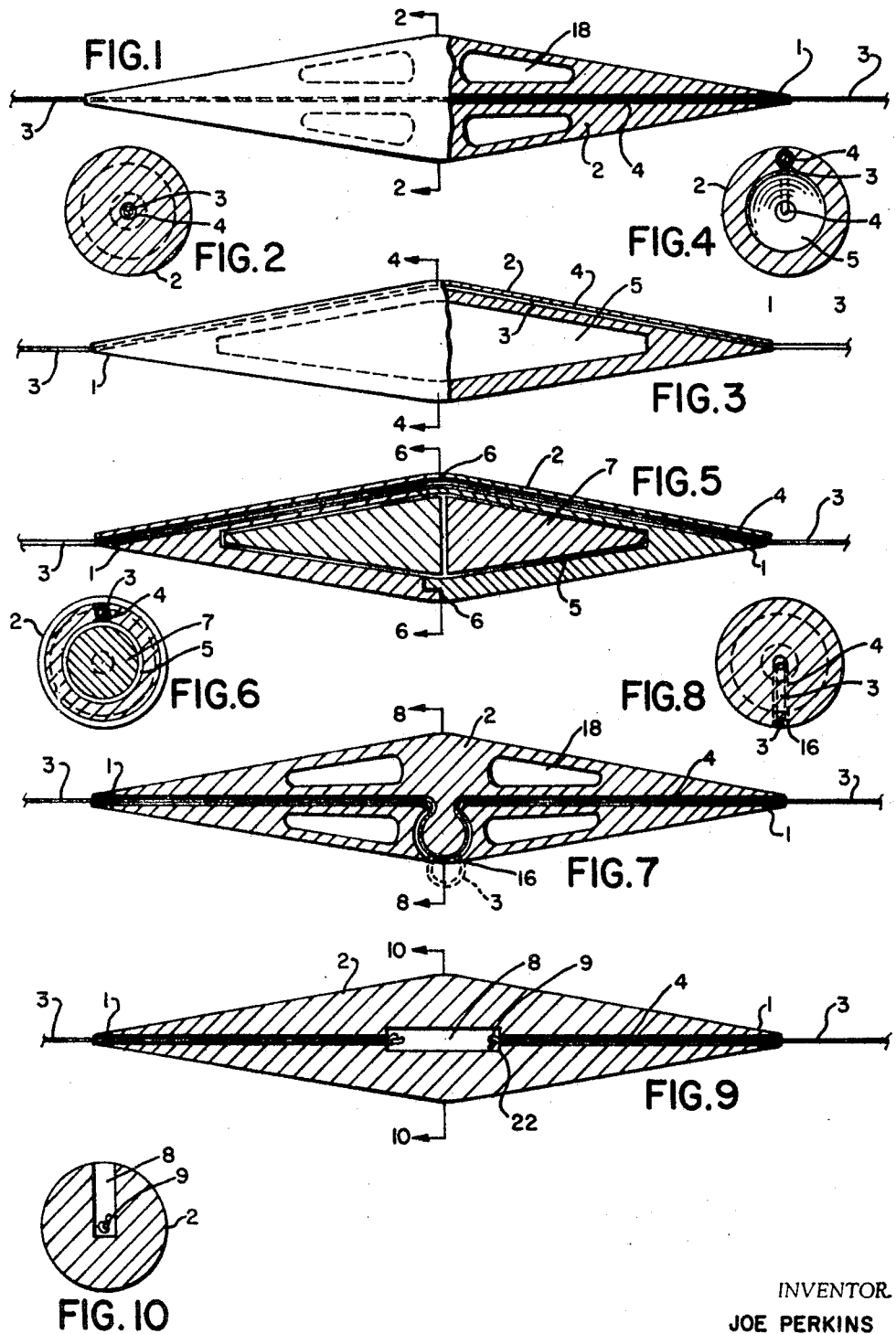

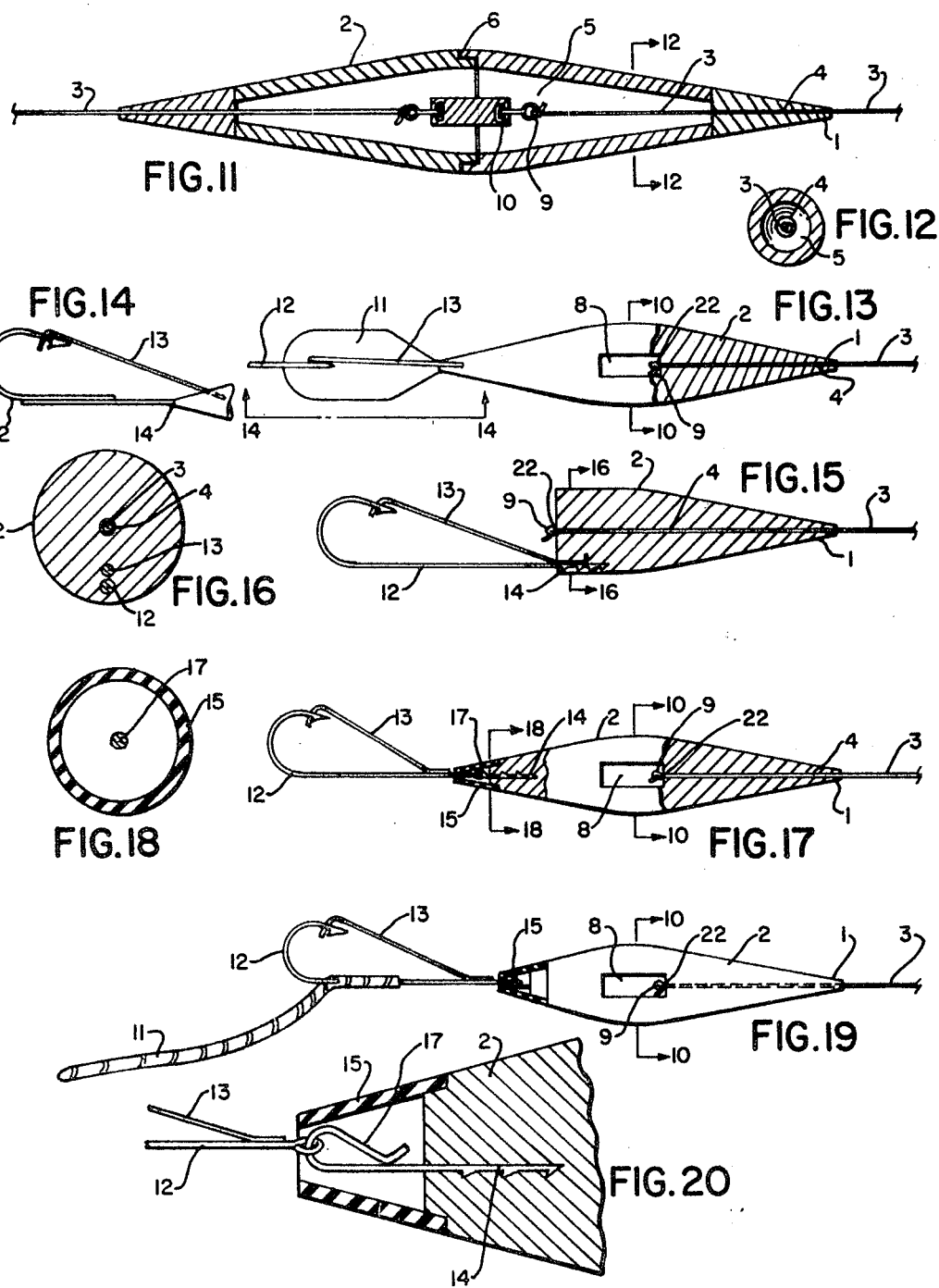

INVENTOR.
JOE PERKINS
BY
*Wm. R. Price*
ATTORNEY

United States Patent Office 3,460,285
Patented Aug. 12, 1969

3,460,285
FISHING LINE ACCESSORY
Joe Perkins, 1614 Jaeger Ave., Louisville, Ky. 40205
Filed Dec. 19, 1966, Ser. No. 602,856
Int. Cl. A01k 93/00, 95/00
U.S. Cl. 43—44.9     4 Claims

ABSTRACT OF THE DISCLOSURE

Weedless fishing line accessories in the form of elongated bodies which taper to a rigid, sharp, annular edge and which contain at least one line receiving bore opening at one end of the body and running axially through the body. Each body has a narrow line threading slot intermediate its ends, extending from the surface of the body medially to form a smooth bearing surface into which the other end of the bore opens. A line extends through the bore and contains a knot in operative relation to the bearing surface, acting as a swivel.

Background of the invention

This invention relates to fishing line accessories and particularly to fishing line accessories which will not hang on weeds, muck, grass, floating debris, etc. Specifically, the invention relates to a line of accessories having certain characteristics of shape and form which may be utilized as sinkers, floats, casting floats, beads, line stops, swivels, line splicers, line knot covers, and heads for hooks and lures. Throughout the specification and in the claims the word fishing line accessory is utilized to encompass any or all of the above-named items. Still more specifically, this invention relates to a series of fishing line accessories which may vary in size, depending upon the use of from a fraction of an inch to several inches in length. The invention relates to a line of fishing accessories which have been known in the art as "weedless" accessories and are designed to avoid fouling of the line or hanging or snagging on objects in, under, or on the water.

Description of the prior art

Many sinkers, lures, and other line attachments have been developed in the past which were intended as no-snag weedless fishing line accessories; however, all of these items will snag under some conditions and will also catch onto weeds, grass, moss, etc.

As early as 1905, Matthews in Patent No. 778,875 devised a guard for a weedless fishhook, which could be used with or without a swivel, and which consisted of a cone-shaped guard which was mounted on the swivel with the eye of the swivel projecting past or through said guard. However, the eye of the swivel itself as well as the knot of the line used to attach the hook to the line tended to snag or foul the line under certain conditions.

Again in Patent No. 2,241,367 to Sarff, a weed guard was disclosed fabricated of rubber or other flexible material which was proposed for use to protect the head of the hook. However, this partial shield was made of flexible material and did not form a firm, sharp, annular edge but rather a blunt flexible tapered point which did not eliminate the necessity for knots on the line, did not pass readily under dense marine growth, and did not slide easily for position. Many other weedless type lures and guards have been proposed; however, they have not been entirely satisfactory at least under conditions involving dense growth.

Summary

This invention embodies a fishing line accessory which in its basic form comprises a smooth elongated body which tapers on at least one end to a rigid, sharp, annular edge. Contained in the needle point is a line receiving bore running axially through said body or a portion thereof and having a diameter large enough to allow the line to pass freely therethrough and to rotate thereon but small enough to keep the annular surface surrounding the line at its point of insertion to a minimum. The line receiving bore must exactly fit the line used. It is necessary to use an accessory with a larger line receiving bore for a larger line. An accessory with a line receiving bore larger than the line used and which does not exactly fit the bore will not work satisfactorily. Basically the line accessory of this invention functions in passing over, around, or through obstacles in or under the water the same as would a smooth enlargement in the line itself. Fishing line accessories manufactured in accordance with this invention may vary substantially in size and weight and as a consequence may be used as sinkers, floats, casting floats, beads, line stops, swivels, line splicers, line knot covers, swivel covers, and heads for hooks and lures. By reason of the rigid, sharp, annular edge, these fishing line accessories, made according to this invention, will not hang or snag on objects in, under, or on the water. The accessories will pass over, under, or around or through rocks, snags, muck, weeds, moss, and grass. They pass such obstacles just as would an enlarged smooth place in the line. When used as line splicers or knot covers it is possible to use a line without a visible knot throughout its length.

It is not necessary to use any type of guard or shield with any of these accessories.

The line accessories made according to this invention are long in relation to the diameter of the body and have a smooth exterior surface except for narrow longitudinal slots for threading purposes which will be developed more fully hereafter. The preferred cross-sectional shape is round although other shapes may be used satisfactorily. They may vary in length from a fraction of an inch to several inches depending upon the ultimate use to which they are to be put.

It is an object of this invention to provide improved fishing line accessories which will not foul the line or hang or snag on objects in, under, or on the water.

Another object of this invention is to provide accessories which may be used on a line without the use of any knots on the line except where the hooks or lures are attached and these are protected by the accessory of this invention.

Another object is to provide a fishing line accessory which may be easily adjusted to different positions on the line without removing it from the line.

Anothe robject is to provide fishing line accessories through which a line may easily pass without leaving an annular margin at the line hole or the sharp, rigid annular edge to snag or hang on anything.

Another object is to provide an accessory that may be used as a light, medium or heavy sinker or as a float or casting float which can easily be changed without removing it from the line.

Another object is to provide a swivel which will allow the line to turn in it on one or more ends against a line knot.

Another object is to provide a fishing line accessory as a cover for a conventional swivel.

Another object is to provide an improved head for hooks and lures.

Another object is to provide a fishing line accessory to which a separate hook or lure may be attached and which allows the line to turn in it against a line knot making it unnecessary to utilize a separate swivel.

Another object is to provide a line accessory that has a bearing surface adapted to swivel against a line knot on the end of a line or a leader and which can also be used in other positions on the line.

Another object is to provide a line attachment which will also provide a line slot and a line or leader point of attachment which may act as a swivel for attaching leaders to the line for use of attaching hooks, lures, or sinkers.

Still another object of this invention is to provide a sinker with a variable casting weight.

Brief description of the drawings

FIG. 1 is a longitudinal sectional view, partly in elevation, illustrating a line accessory of my invention utilized as a sinker, a float or a bead and the relationship of the line thereto.

FIG. 2 is a transverse sectional view, taken along lines 2—2 of FIG. 1.

FIG. 3 is a longitudinal sectional view, partly in elevation, illustrating a hollow float and the manner in which the line passes through it.

FIG. 4 is a transverse sectional view taken along lines 4—4 of FIG. 3.

FIG. 5 is a longitudinal sectional view of a hollow accessory having a core, illustrating the frictional connection of both halves of the hollow shell and the relationship of the line thereto.

FIG. 6 is a transverse sectional view taken along lines 6—6 of FIG. 5.

FIG. 7 is a longitudinal sectional view of a line accessory which may be used as a line stop, sinker, or float, and the structure for frictionally engaging the line at a fixed point.

FIG. 8 is a transverse sectional view taken along lines 8—8 of FIG. 7 illustrating the relationship of the line thereto.

FIG. 9 is a longitudinal sectional view of a line accessory which may be used as a casting float, a sinker, a line splicer, or a swivel, which utilizes the engagement of a line knot against the bearing surface of the accessory as a swivel.

FIG. 10 is a transverse sectional view taken along lines 10—10 of FIGS. 9, 13, 17, 19, and 24 illustrating the longitudinal groove in the body of the accessory for threading the line and affixing a knot therein.

FIG. 11 is a longitudinal sectional view of a hollow fishing line accessory utilized as a swivel cover illustrating the fractional engagement of the two halves of the shell and the relationship of the line and the swivel thereto.

FIG. 12 is a transverse sectional view taken along lines 12—12 of FIG. 11 illustrating the relationship of the line and the line receiving bore.

FIG. 13 is a longitudinal sectional view, partially in plan, illustrating the line accessory of this invention used as the head of a lure, and utilizing an internal line knot against a bearing surface as a swivel.

FIG. 14 is an enlarged fragmentary view, in side elevation, taken along lines 14—14 of FIG. 13.

FIG. 15 is a longitudinal sectional view of a fishing line accessory utilized as a head of a hook utilizing an exterior line knot as a swivel.

FIG. 16 is a transverse sectional view taken along lines 16—16 of FIG. 15 illustrating the relationship of the line and the anchor for the hook.

FIG. 17 is a longitudinal sectional view, partially in elevation, of a fishing line accessory utilized as a clip for attachment of a conventional hook and as a swivel for said weedless type hook.

FIG. 18 is a transverse sectional view taken along lines 18—18 of FIG. 17 illustrating an elastic type collar which protects the area surrounding the clip and the head of the hook.

FIG. 19 is a side elevational view, partially in section, of a line accessory used as the head and as the swivel for a hook, with lure attached.

FIG. 20 is an enlarged fragmentary sectional view illustrating the anchoring means for the hook and the elastic collar therefor.

Description of the preferred embodiments

Figure 22:
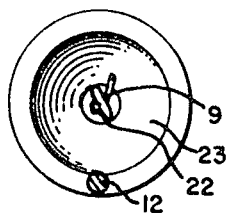
FIG. 22 is an end view taken along lines 22—22 of FIG. 21 illustrating the recessed area in which the line knot fits to act as a swivel against the bearing surface of the recessed area of said accessory.

Referring now to FIGS. 1 and 2, there is shown a preferred embodiment of a fishing line accessory which may be used as a sinker or as a float. The accessory itself has a long smooth body 2 which tapers at each end to a sharp annular edge 1. Contained in the sharp, annular edge is a line receiving bore 4 running axially throughout the body to emerge at the other sharp, annular edge. The diameter of the line receiving bore 4 is just large enough to receive line 3 so that it will pass through the line receiving bore 4 freely and rotate therein but keeping the annular surface at the sharp, annular edge 1 to a minimum. This allows the fishing accessory to be pulled in either direction so that it will not hang or snag on anything but will pass through vegetation just as would an enlarged smooth place in the line. Contained in the body 2 are a series of sealed air pockets 18 which give a certain amount of buoyancy to the accessory. This accessory may be made in many different sizes and weights so that the ultimate weight depends on both the size and the material of fabrication. The design may be made of light material and a very small size to be used as a bead on a line. It may also be used as a float by varying the material of fabrication and by varying the size of the air pockets so that the accessory will float.

FIGS. 3 and 4 illustrate a preferred embodiment of a float in which the body 2 is in the form of a shell surrounding a cavity 5. In this embodiment the line receiving bore 4 opens in a sharp, annular edge 1 but runs longitudinally along the shell and exits in the opposite sharp, annular edge. Again the diameter of the line receiving bore 4 is such that line 3 freely passes therethrough leaving a minimal annular space surrounding the line at the sharp annular edge at either end of the accessory.

A modification illustrated in FIGS. 5 and 6 demonstrates how the body portion 2 is divided into two halves which are frictionally engaged at 6. In this modification a removable core in two or more pieces may be inserted in the cavity 5 and in such instances the accessory may be used as a sinker or as a casting float. Without the core, of course, the accessory is utilizable as a float. One of the advantages of this accessory aside from the fact that it may be alternately used as a float or sinker is the fact that the two halves may be disconnected and the cores inserted or removed without removing the accessory from the line. It is also possible to reposition the accessory on the line easily by merely sliding it to the point desired. This generally is true of all of the accessories shown in the drawings.

A line stop to be placed on line 3 to regulate the positions of a sinker or of a float is shown in FIGS. 7 and 8. In this modification the line 3 is inserted through the axial bore 4 which runs to the middle of the body 2 and sharply turns to join a frictional line positioning groove 16 on the exterior surface of the middle of the body 2. As is shown in broken lines, the line 3 may be pulled loose from the frictional line positioning groove 16 to position the line stop at any point on the line desired. Thereafter the line is pulled taut thus engaging the line 3 in the frictional line positioning groove 16 holding the line stop in a desired position on the line. In the modification shown there are provided air pockets 18 to provide buoyancy; however, it is within the scope of this invention to utilize a solid body portion so that the accessory may be used as a sinker or in connection with a sinker.

FIGS. 9 and 10 illustrate a swivel wherein the swivel is effected by means of a knot 9 on line 3 in cooperation with a smooth bearing surface 22. In this modification the line receiving bore 4 opening in the sharp, rigid annular edge 1 runs axially through the body portion 2 until it emerges in line threading slot 8. The surface surrounding the line receiving bore 4 in slot 8 is smooth so as to act as a smooth bearing surface 22 against which a knot 9 is allowed to swivel. The line 3 is threaded onto the accessory by inserting it through the line receiving bore 4 until it emerges into the line threading slot 8. It is pulled from the slot and knot 9 is made therein which prevents the line from slipping back through the line receiving bore 4 and allows the knot 9 to swivel against the smooth bearing surface 22. Another use to which this modification may be put is a line splicer wherein two ends of the line may be tied in a knot which then fits in the middle of slot 8, the knot acting both to position the accessory and acting also as a swivel against the bearing surface 22. Alternately, a knot can be tied in each end of the line as illustrated in FIG. 9 so that each line can swivel independently of the other.

FIGS. 11 and 12 illustrate a modification of the accessory shown in FIG. 5 in which the line receiving bore runs into the cavity 5 to allow the line to be attached to a conventional swivel 10 by knot 9. The accessory in this instance acts then as a swivel cover and may be taken apart at point 6 to remove the swivel and to splice line 3. In the latter instance the accessory then will act as a line splicer or as a knot cover.

FIGS. 13 and 14 show a preferred embodiment of the accessory of this invention utilized as a head to which a lure 11 is permanently anchored at point 14. Again the accessory is a long smooth solid body 2 tapered from the center to form a rigid shape, annular edge 1. It is also tapered from the center to the rear end to the point at which the lure 11 is anchored. The line receiving bore is provided longitudinally from the sharp, annular edge 1 lengthwise through the front end of body 2 to terminate at line receiving slot 8. The front wall of line receiving slot 8 provides a smooth bearing surface 22 against which a knot 9 in line 3 will swivel or act as a line stop. The line threading slot 8, of course, provides a method of threading the line 3 through line receiving bore 4 and pulling the line sufficiently far out to allow the fisherman to attach line knot 9 before pulling it back into the slot and out of the way. The width of a portion of slot 8 is approximately two to three times the diameter of line 3 to permit the line knot 9 to be inserted therein. The lure 11 and weed guard 13 are molded or otherwise permanently attached to the rear end of the body 2 as shown at 14.

FIGS. 15 and 16 illustrate a preferred embodiment of a head to which a hook 12 and a weed guard 13 are permanently anchored as shown at 14. The head is solid, long, and smooth and tapers from the rear end of the body 2 to form a sharp rigid sharp, annular edge 1. The line receiving bore 4 opening in the sharp, annular edge 1 runs lengthwise through the center of the head to exit at the rear end of the body portion 2. The rear wall of the body surface provides a smooth bearing surface 22 against which knot 9 may swivel or act as a line stop.

Another modification of my accessory is shown in FIGS. 17 and 18 in which a clip 17 is used for attaching a conventional hook 12 with weed guard 13. In this instance an elastic collar 15 fits over the rear portion of the accessory and covers the clip 17 and the eye of the hook 15 to prevent this portion from becoming entangled in vegetation and other debris. Again, the line receiving bore extends from the needle point 1 to the front wall forming knot bearing surface 22 of line threading slot 8 allowing knot 9 to be tied in the line to act as a swivel.

FIGS. 19 and 20 illustrate a modification of the accessory shown in FIGS. 17 and 18 wherein the elastic collar 15 surrounds the head of a hook 12 and a lure such as a plastic or rubber worm 11. The clip 17 anchored at point 14 in the body 2 of the head and the head end of a hook 12 and lure 11 are protected from becoming snagged by elastic collar 15.

Figure 21:
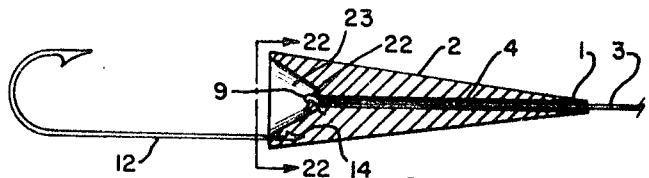
FIG. 21 is a longitudinal sectional view of the line accessory of this invention utilized as the head and swivel or line stop for a hook.

FIGS. 21 and 22 illustrate a preferred embodiment of a head for a hook 12, especially a small hook, wherein the head is made as an integral part of the hook. The head is long and smooth and tapers to a rigid sharp, annular edge 1 which contains the line receiving bore 4 through which line 3 is threaded to end in an annular recess 23. The wall of the annular recess surrounding the line receiving bore 4 is smooth to provide a smooth bearing surface 22 against which a knot 9 in the line may act as a swivel.

Figure 23:
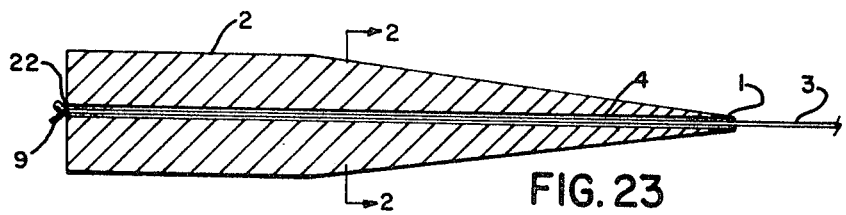
FIG. 23 is a longitudinal sectional view of the fishing line accessory of my invention used as a sinker with an external line knot to provide a swivel.

FIG. 23 illustrates a preferred embodiment of my accessory utilized as a sinker. In this modification the body 2 tapers from a point near the rear end to a sharp rigid needle point 1. The line receiving bore opens into the needle point and the line 3 is threaded through the axially extending bore to terminate against smooth bearing surface 22 at the rear end of the body portion 2. The knot 9 in line 3 again acts as a swivel so that the accessory may turn or rotate around the line without twisting the line.

Figure 24:
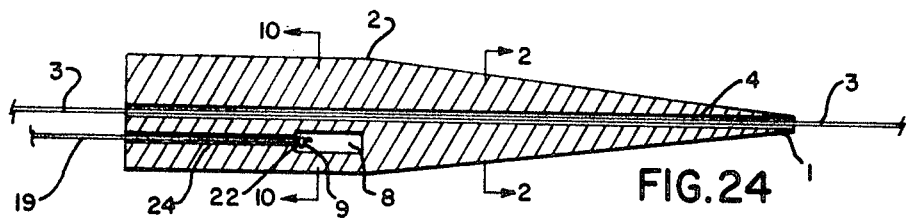
FIG. 24 is a longitudinal sectional view of the line accessory of my invention containing an additional line bore and a threading slot for an internal line knot swivel or a leader stop for a leader.

In a related embodiment shown in FIG. 24, there is provided an accessory line receiving bore 24 into which a leader 19 may be threaded to terminate at the line threading slot 8. The wall of the line threading slot 8 is smooth to provide a smooth bearing surface 22 against which the leader knot may swivel without turning the line 3.

Figure 25:
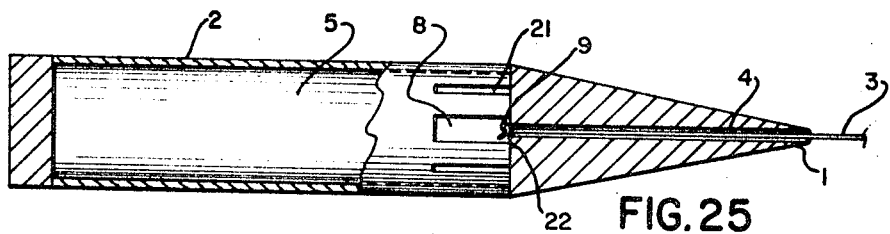
FIG. 25 is a side elevation, partially in section with portions cut away to illustrate the fishing line accessory of my invention used as a variable weight casting sinker with an internal line knot swivel.

FIG. 25 illustrates a variable weight casting sinker which consists of the body portion 2 having a solid rear end of nonvariable weight and a cavity 5. Communicating with cavity 5 are openings 21 through which water may be added or removed. The front end of the body portion 2 tapers to a rigid sharp annular edge 1 containing the opening for line receiving bore 4 through which line 3 may be threaded to line threading slot 8. In use water is added through narrow slots 21 to fill the hollow cavity 5 until the proper weight for casting is achieved. After the cast, when the sinker is in the water, the slots 21 allow additional water to seep through into the cavity 5 thus equalizing the pressure and the weight and causing the sinker to lose any additional weight used for casting due to the buoying effect of surrounding water.

It will be appreciated that I have provided a structure which may be modified to many uses as accessories for the line fisherman. Basically, the invention involves the use of an accessory tapering at least at one end to a sharp rigid annular edge containing a line receiving bore of slightly larger diameter than the line to be used. By provision of smooth bearing surfaces a knot in the line either internal or external may be used as a swivel. The accessory may be used as a bead, a knot cover, a line splicer, a sinker, or a float, or a variable weight casting float or a swivel or swivel cover or a head for hooks or lures utilizing generally the structural features and operational principles of my invention.

Having thus described my invention what I wish to claim is:

1. A fishing line accessory comprising:
   (A) a smooth, elongated body tapering at one end to a rigid, sharp, annular edge;
   (B) a line receiving bore, opening at one end of said body and running longitudinally through a portion of said body;

(C) the further combination of a narrow line threading slot, at an intermediate point on the body of said accessory, said slot extending from the surface of said body medially to form a smooth bearing surface into which said line receiving bore opens at its other end;

(D) the further combination therewith of a line extending through said bore and containing a knot which is in operative relation with said smooth bearing surface to form a swivel.

2. A fishing line accessory, as defined in claim 1, the combination therewith of a second line receiving bore extending axially from the other end of said accessory to the other end of said threading slot forming a second smooth bearing surface, the further combination therewith of a second line extending through said second bore and a knot on said second line in operative relation with said second smooth bearing surface to form a swivel.

3. A fishing line accessory, as defined in claim 1, the further combination therewith of:

(A) a second line receiving bore, opening at one end in said sharp annular edge of said body, and running longitudinally through a portion of said body;

(1) said second bore having a diameter large enough to freely accommodate the passage of a fishing line therethrough but small enough to keep the annular space between said line and said annular edge at a minimum.

4. A fishing line accessory, as defined in claim 1, in which:

(A) a part of said body is hollow to form a cavity;

(B) the further combination therewith of slots communicating with said cavity;

(C) so that water added through said slots produces a variable weight accessory, whereby additional weight is added to the accessory for casting which weight is equalized after the accessory enters the water.

References Cited

UNITED STATES PATENTS

| | | | |
|---|---|---|---|
| 1,344,176 | 6/1920 | Cressler et al. | |
| 1,480,655 | 1/1924 | Bennett | 43—43.1 |
| 2,241,367 | 5/1941 | Sarff. | |
| 2,465,064 | 3/1949 | Colosimo | 43—42.49 X |
| 2,785,500 | 3/1957 | Ashley | 43—44.97 |
| 2,926,452 | 3/1960 | Lewis | 43—42.4 X |
| 2,958,153 | 11/1960 | Yerman et al. | 43—43.14 |

ALDRICH F. MEDBURY, Primary Examiner

JAMES H. CZERWONSKY, Assistant Examiner

U.S. Cl. X.R.

43—42